Patented Aug. 20, 1940

2,211,913

UNITED STATES PATENT OFFICE 2,211,913

PROCESS OF PRODUCING MALEIC ANHYDRIDE-GLYCERINE-ROSIN RESIN

Patrick John Ryan, Royal Oak, and Almon G. Hovey, Pleasant Ridge, Mich., assignors to Reichhold Chemicals, Inc., formerly Beck, Koller & Company, Inc., Detroit, Mich.

No Drawing. Application May 19, 1939,
Serial No. 274,646

1 Claim. (Cl. 260—26)

The invention relates to an improvement in the manufacture of resins from maleic anhydride, glycerine and rosin as the sole or at least the principal reacting ingredients, said resins being particularly adapted for use in varnish and lacquer manufacture, for hot melt coating compounds and for compounding with vegetable oils, other resins and cellulose derivatives.

As is known maleic anhydride possesses very strong corrosive properties and when it comes in contact with a metal vessel during ordinary cooking processes discoloration of the final product results.

According to our invention the maleic anhydride and a molecular excess glycerine are first reacted together, preferably in a glass-lined kettle, and held for an acid number of about 30 or less whereupon said reaction product is added to melted rosin and reacted therewith.

Many processes for combining such ingredients are known to the art but such processes have been subject to various technical disadvantages which are overcome by the present improvement. For example, our improved method serves to avoid the discoloration resulting from the processes now in use due to the solution of small amounts of metallic compounds by free maleic acid or by maleinized rosin (the polybasic acid formed from the Diels Alder addition of maleic anhydride to rosin). Apparently the reaction of maleic anhydride cannot be avoided by the use of any commercial structural metal used in the fabrication of processing kettles.

By our method, we find that not only better color results, but also by this method, we get a higher melting point than may be obtained by reacting maleic anhydride with rosin before the addition of glycerine, and also better than is obtained by reacting rosin with glycerine with subsequent addition of maleic anhydride, or by the simultaneous reaction of all three. We obtain a product having a high melting point with the use of less of the expensive maleic anhydride in proportion to the other two ingredients.

While it is true that Arsem, in 1914, described resinous products produced from polybasic acids, polyhydric alcohols, and monobasic acids, such as rosin, and Ellis, in 1922, in U. S. Patent No. 1,897,977, described reaction products of maleic acid, glycerine, and rosin, the ordinary commercial operations of these resin formations are very poor in color and/or melting point for a given percentage of maleic anhydride. Ellis, in U. S. Patent No. 2,063,542 (December 8, 1936) has described the so-called "diene" method of making maleic acid glycerine rosin by reacting the rosin and maleic anhydride first, and then adding glycerine. This process, while it may on the one hand have certain advantages, has on the other hand very decided disadvantages, one of which, in particular, is the poor color which almost inevitably results when the process is carried out in the presence of those metals which necessarily have to be used in commercial apparatus.

The present two-stage process wherein the maleic anhydride and glycerine are first reacted and then added to melted rosin gives uniformly good color and secures a maximum melting point for the least amount of maleic anhydride used.

The process, particularly in the first stage, should be very carefully carried out. The herein described details should be adhered to closely to obtain the best results and the first (intermediate product) stage of the batch should not be run to a temperature substantially above 170° C. because of the danger that the heat of reaction may convert the intermediate product of the first stage to an insoluble, infusible gel. If the temperature is allowed to climb to 230° C., gelation occurs at an acid number of about 150, and the material may not only have to be thrown away, but in addition such gelling may cause the agitator to break thereby ruining the kettle, and in any event several days' labor would be required for chipping out the resin and cleaning the kettle ready for the next batch. If reaction is carried out at substantially 170° C. acid numbers of 30–60 are obtained without gelation.

By our method of making the intermediate in stage 1 in a glass-lined kettle, the danger of dissolving metal salts, contaminating the resin and darkening the color is removed. We have found our method to be quite foolproof in securing good color and melting point as contrasted with the meticulous care to protect color while forcing the resin to a high melting point that is necessary in preparing similar resins by other methods. When rosin is reacted with maleic anhydride first, as by Ellis' "diene method" (U. S. Patent No. 2,063,542, 1936), and then glycerine added, the color is almost invariably very much darkened. Occasionally good batches may result according to this method, but the good results are difficult to reproduce and dark-colored batches often result in spite of all precautions taken. The same is also true of the prior process which involves the formation of a glycerol ester of rosin first, and then adding the maleic anhydride. In either case, the color is much darker than by our method, due to the presence of corrosion products from the metal kettle. Whenever the glycerol or the maleic anhydride are reacted first with the rosin, the melting points of the final products are never as high as when made by our method, provided the same ratio of maleic anhydride to rosin is employed.

Example 1

As an example as to how our invention is carried out, the following two-stage process serves as an example:

*Stage one.*—3427 pounds of a good grade of dynamite glycerine (98% pure) are heated to 170° C. with 2070 pounds of maleic anhydride preferably in a glass-lined processing kettle, and held for an acid number of approximately 30 or less.

*Stage two.*—23,000 pounds of N Gum Rosin are melted in a metallic processing kettle preferably of stainless steel, monel, aluminum, etc., at 180° C. The product from Stage one is introduced slowly in order to prevent excessive foaming. The reaction mixture is remarkably free from foaming, however, when reasonable care is taken. The product is then raised to a temperature of 230–240° C. (not even needing $CO_2$ inert gas protection) and a final product having a melting range of 115–125° C. results with subsequent vacuum treatment.

The results of our process (using only 9 parts by weight of maleic anhydride per 100 parts by weight of N Gum Rosin) are as follows:

Cube color _____ Closer to WG than to N (without bleaching).
Acid number _____ 33.8.
Melting range _____ 115–125° C. (by capillary method).
Viscosity in 60% toluol solution _____ M–N.
Clarity of resin solution in toluol _____ Excellent.
Lacquer compatibility ___ Satisfactory.

The product of Stage one at 170° C. may be added slowly to the rosin which is at 240° C., but if rosin at 240° C. is added to the product from Stage one at 170° C., gelation occurs.

*Example 2 (Prior art)*

This example shows results of the "diene" method using the same raw materials from the same lots as Example 1.

If 10,000 pounds of N American Gum Rosin, 1,250 pounds of maleic anhydride, and 1,735 pounds of High Gravity 98% CP Glycerine are reacted according to the pre-formation of the "diene" reaction, before the addition of glycerine, a very definite, contrasting result takes place to those obtained by use of our method, as described in Example 1. If the rosin is heated to 150° C., then the maleic anhydride added and allowed to react for 3–4 hours before the addition of the glycerine at 230° C. with an elevation to 280° C. for final cooking, and if a 25'' vacuum is applied at 280° C. during the final 2 hours in order to increase the melting point to its maximum efficiency, the final results (using 12.5 parts by weight of maleic anhydride for 100 parts by weight of N Gum Rosin) are as follows:

Cube color _____ Closer to I than to K (without bleaching).
Acid number _____ 29.7.
Melting range _____ 115–125° C. (by capillary method).
Viscosity in 60% toluol solution _____ K–L.
Clarity of solution _____ Good.
Lacquer compatibility __ Satisfactory.

Among the advantages of our process (Example 1) may be mentioned:

1. Better color for both varnishes and lacquers.
2. More economic use of the maleic anhydride which is the most expensive ingredient, i. e., a higher melting point product is obtained for the same amount of maleic anhydride, or conversely less maleic anhydride may be used to obtain a reasonably high melting point product.
3. Greater operativeness, i. e., the process is much more certain as to color. Reasonable precautions must be taken, of course, but in general no other method is known in which large amounts of rosin may be reacted in this type of synthetic resin at temperatures such as described in the present application to obtain as good a color as that of the original rosin, unless bleaching agents are added.
4. The present process permits the use of commercial apparatus ordinarily employed by resin manufacturers, in carrying out the second stage operation. In the final resinous cook, the present process is much safer under vacuum for color than when the ingredients are cooked either by the old Arsem method or by the Ellis method. Cooking under vacuum always presents a danger of sucking in some air and thereby darkening the batch. In large scale commercial apparatus which is always provided with an agitator, an outlet, sampling devices, etc., air is likely to be sucked in even though the greatest care is exercised to prevent this.
5. *Clarity.*—The clearness of the resin and of solutions thereof are very desirable features since no bleach is required on account of the fact that there is no darkening from the original rosin color, and sometimes even slightly better color results than that of the original rosin used in the resin. No cloudiness is caused by any precipitation caused by a bleaching agent.

It will be understood, of course, that bleaching of the resin in the final stages may also be carried out and still lighter color be obtained thereby. However, it is especially desirable not to have to bleach on account of clarity of the product, unless it is filtered before being used in these resins.

As the results, using this method, are so much better than those obtainable by any of the other methods heretofore known, it may seem strange that the process was not employed before. It was, however, previously thought to be impractical to react maleic anhydride and glycerine alone without the mixture gelling. Actually, however, reduction in the acidity of the maleic anhydride, which is very highly corrosive, is accomplished by using a very substantial molecular excess of glycerol. When the acidity of the corrosive maleic anhydride is reduced to a point where it does not attack stainless steel, monel metal, and other metals employed in the fabrication of kettles, the interaction product may then be treated in the conventional large factory kettles for reaction with rosin, without picking up metal salts and without being susceptible to oxidation and darkening. In boiling this intermediate interaction product with glycerol in molecular excess, the most efficient utilization of the minimum amount of maleic anhydride is made possible. The excess of glycerol which protects the maleic glyceride from gelation in the first stage is subsequently used in the second stage for reaction with the rosin.

A lower maximum cooking temperature than 280° C. may be used by our process with equal success in obtaining a final melting point as compared to the "diene" process. A final cooking temperature of 230–250° C. is about the least that can be employed to obtain the final maximum melting point.

Resins have been made without any vacuum with equal success.

We claim:

A two-stage process for producing resins on a commercial scale, suitable for use in the production of varnishes and lacquers from maleic anhydride, glycerine and rosin as the principal reacting ingredients in which process the final stage is adapted to be carried out in a metal processing kettle without discoloration of the final product; which process comprises initially heating together maleic anhydride and a substantial molecular excess of glycerine at a temperature of substantially 170° C. in a glass-lined vessel to produce a non-corrosive intermediate product having an acid number of approximately 30 to 60, then slowly adding the said product to melted rosin in a metal processing kettle at a temperature of about 180° C., and heating together the rosin and said intermediate product at a temperature of about 230–250° C. until a final resinous product having a melting range of 115–125° C. is obtained.

PATRICK JOHN RYAN.
ALMON G. HOVEY.